United States Patent
Ramalingam (10) Patent No.: US 8,442,305 B2
(45) Date of Patent: May 14, 2013

(54) METHOD FOR DETERMINING 3D POSES USING POINTS AND LINES

(75) Inventor: Srikumar Ramalingam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 465 days.

(21) Appl. No.: 12/824,828

(22) Filed: Jun. 28, 2010

(65) Prior Publication Data

US 2011/0150319 A1 Jun. 23, 2011

Related U.S. Application Data

(63) Continuation-in-part of application No. 12/495,655, filed on Jun. 30, 2009, now Pat. No. 8,249,302.

(51) Int. Cl.
*G06K 9/00* (2006.01)

(52) U.S. Cl.
USPC .......................................................... 382/154

(58) Field of Classification Search ... 382/154; 345/419, 345/427; 356/12
See application file for complete search history.

(56) References Cited

U.S. PATENT DOCUMENTS

| | | | |
|---|---|---|---|
| 7,359,526 B2 | 4/2008 | Nister | |
| 2006/0165293 A1* | 7/2006 | Hamanaka | 382/209 |
| 2006/0285755 A1* | 12/2006 | Hager et al. | 382/224 |
| 2008/0095402 A1* | 4/2008 | Kochi et al. | 382/103 |
| 2008/0292180 A1* | 11/2008 | Kobayashi et al. | 382/154 |
| 2009/0096790 A1* | 4/2009 | Wiedemann et al. | 345/427 |
| 2009/0154793 A1* | 6/2009 | Shin et al. | 382/154 |

* cited by examiner

*Primary Examiner* — Edward Park
(74) *Attorney, Agent, or Firm* — Gene Vinokur; Dirk Brinkman (57) ABSTRACT

A three-dimensional (3D) pose of a 3D object in an environment is determined by extracting features from an image acquired of the environment by a camera. The features are matched to a 3D model of the environment to determine correspondences. A camera reference frame of the image and a world reference frame of the environment are transformed to a corresponding intermediate camera reference frame and a corresponding world reference frame using the correspondences. Geometrical constraints are applied to the intermediate camera reference frame and the intermediate world reference frame to obtain a constrained intermediate world reference frame and a constrained world reference frame. The 3D pose is then determined from parameters of the constrained intermediate world reference frame and the constrained world reference frame.

12 Claims, 7 Drawing Sheets

METHOD FOR DETERMINING 3D POSES USING POINTS AND LINES

RELATED APPLICATIONS

This is a continuation-in-part of U.S. application Ser. No. 12/495,655, "Method for Determining a Location From Images Acquired of an Environment with an Omni-Directional Camera," filed Jul. 30, 2009 now U.S. Pat. No. 8,249,302, by Ramalingam et al., incorporated herein by reference. This patent application is related to U.S. application Ser. No. 12/824,296 filed Jun. 28, 2010, by Ramalingam et al., entitled "Method and System for Localizing in Urban Environments from Omni-Direction Skyline Images," and MERL-2251 application Ser. No. 12/824,329 filed Jun. 28, 2010, by Ramalingam et al., entitled "Method for Registering 3D Points with 3D Planes," incorporated herein by reference.

FIELD OF THE INVENTION

This invention relates generally to estimating poses, and more particularly to estimate poses in environments for the purpose of geo-location.

BACKGROUND OF THE INVENTION

In computer vision applications, a wide variety of geometrical problems are solved using image features, such as points and lines. Conventional methods use all the available features and solve the problem using least squares measure over all of the features. However, in many computer vision problems, minimal solutions have proven to be less noise-prone compared to non-minimal methods.

Minimal solutions have been very useful as hypothesis generators in hypothesize-and-test procedures such as RANdom SAmple Consensus (RANSAC), see U.S. Pat. No. 7,359,526.

Minimal solutions are known for several computer vision problems: auto-calibration of radial distortion, perspective three point problem, the five point relative pose problem, the six point focal length problem, the six point generalized camera problem, the nine point problem for estimating paracatadioptric fundamental matrices, and the nine point radial distortion problem. There are also unification efforts to keep track of all the known solutions.

2D-3D Registration

The invention is particularly concerned with pose estimation using points and lines. A pose is defined as having three degrees of freedom in translation and rotation. Given three correspondences between points and lines in a world reference frame, and their projections on an image in a camera reference frame, the goal is determine the pose between the camera in the world reference frames. Solution for three lines, or three points configurations are known. As defined herein, a "reference frame" is a 3D coordinate system.

In practice, both point and line features have complementary advantages. In deference to our intended application of geo-localization in urban environments, using image sequences and coarse 3D model, it is relatively easy to obtain the correspondences between lines in the 3D model and the images.

Point matching between two images is also well-known, and easier than line matching. Although, the fusion of points and lines for tracking has been described, a minimal solution, which is less sensitive to outliers, insufficient correspondences and narrow field of view, have not been described in the prior art.

Recently, minimal pose procedures for stereo cameras have been described using either points or lines, but not both.

Image-Based Geo-Localization

There has been an increasing interest in inferring geo-locations from images. It is possible to obtain a geo-spatial localization by matching a query image with an image stored in database using a vanishing vertical direction.

Several 3D reconstruction procedures have been described for the reconstruction of large urban environments. One localization method matches lines from a 3D model with lines in images acquired of a controlled indoor environment by a wide angle camera.

However, determining poses in outdoor environments, such as "urban canyons," is a more difficult challenge. It is well known that pose estimation for the purpose of geo-location in such environments is often difficult with GPS-based solutions where radio reception is poor.

Therefore, it is desired to provide camera-based solution for such geo-location applications.

SUMMARY OF THE INVENTION

The embodiments of our invention provide a method for solving geometrical problems in computer vision using a minimal number of image features. The method uses geometrical collinearity and coplanarity constraints to provide solutions for four minimal geometrical problems.

We use intermediate reference frames to simplify equations involved in pose estimation. As defined herein, a "reference frame" is a 3D coordinate system. A conventional application of the constraints leads to the solution of a $64^{th}$ degree polynomial equations. With our intermediate reference frames the problem reduces to $4^{th}$ and $8^{th}$ degree polynomial equations.

For the minimal pose estimation, we provide last two missing items using points and lines.

Pose estimation refers to the problem of recovering the pose of a camera given known features (points and lines) in the world and their projections on an image. There are four minimal configurations using point and line features: 3 points, 2 points and 1 line, 1 point and 2 lines, and 3 lines. Solutions for the first and the last configurations, which depend solely on either points or lines, are known.

However the mixed configurations, which are more common in practice, have not been solved up until now.

We show that it is indeed possible to develop a general technique that can solve all four configurations using the same approach, and that the solutions involve determining the roots of either a $4^{th}$ degree, or an $8^{th}$ degree polynomial equation.

The key is the selection of appropriate intermediate reference frames, and the use of collinearity and coplanarity constraints in solving the pose estimation problem. We also provide a compelling application for geo-localization using image sequences, and coarse 3D models of GPS-challenged urban environments where radio reception is poor.

DETAILED DESCRIPTION OF THE PREFERRED EMBODIMENTS

Figure 6:
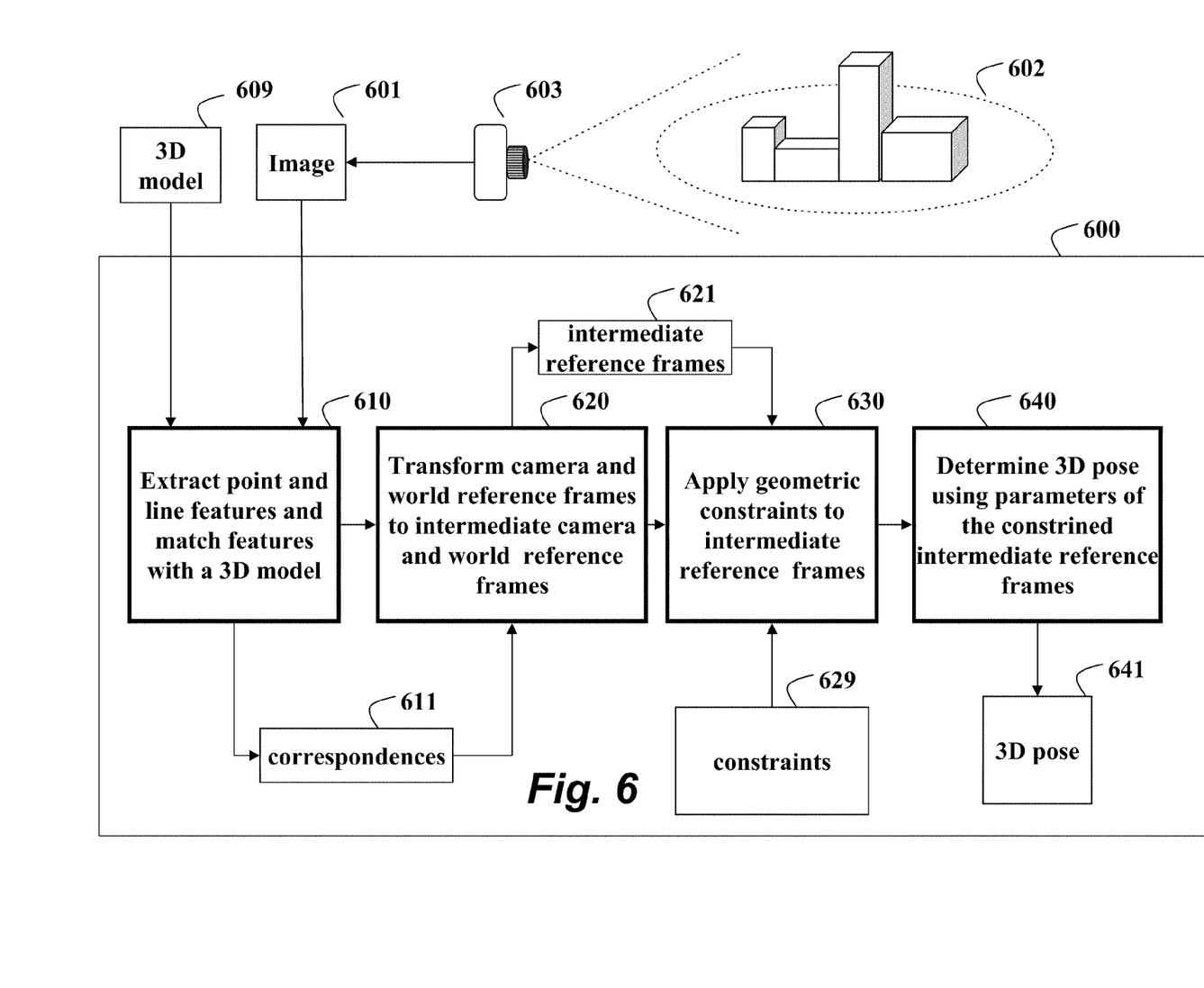
FIG. 6 is a flow block diagram of a minimal pose estimation method according to embodiments of the invention.

FIG. 6 shows a method for determining a 3D pose 641 of an object in an environment 602 according to embodiments of our invention. The pose has three degrees of freedom in translation (T), and three degrees of freedom in rotation (R).

Features are extracted 610 from points and lines in an image 601 acquired of the environment by a camera 603. The features are matched to a 3D model 609 of the environment to determine correspondences 611.

The correspondences are used to transform a camera reference frame of the image and a world reference frame of the environment to corresponding intermediate camera and world reference frames 621. As defined herein, a "reference frame" is a 3D coordinate system. Geometric constraints are applied 630 to the intermediate frames. Then, the 3D pose is determined 640 using parameters of the constrained reference frames.

Figure 7:
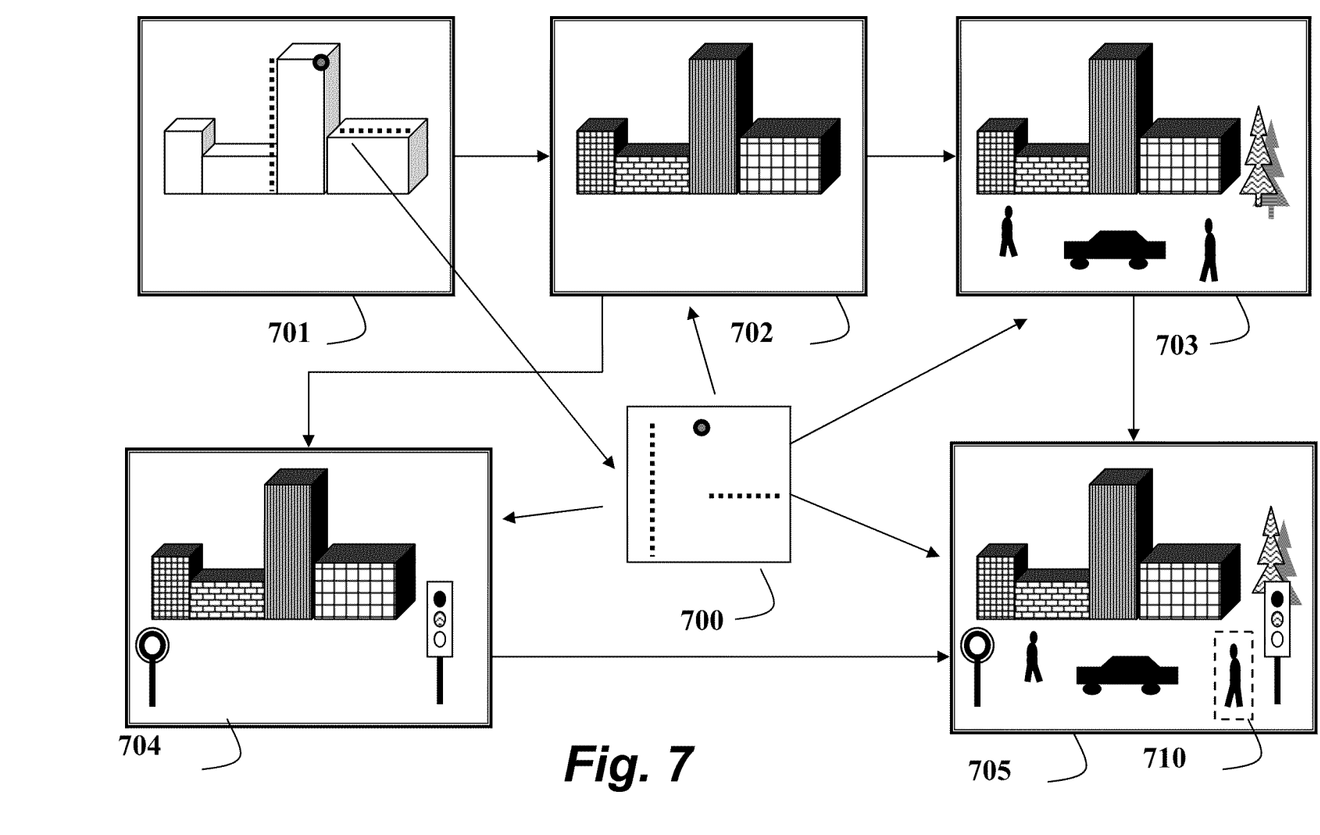
FIG. 7 is a schematic of a method for constructing a 3D model of an urban environment used for enhanced geo-location and object detection in the environment.

FIG. 7 shows step that can be performed to construct a 3D model of an environment, e.g., an outdoor urban scene. A coarse textureless 3D model is acquired, for example from Google 3D Warehouse. Alternatively, the coarse model is constructed from images acquired by a camera mounted on a vehicle navigating through the environment.

Texture can be added 702 using, for example, Google and SketchUp. The textured model can be populated 703, and street signs can also be added 704 using projective mapping to produce a detailed 3D model. During the construction, a few points and lines 700 of the urban environment can be extracted from the images. These points and lines are then used to determine the pose of the various objects using the method described herein. The detailed 3D model can then be used for geo-location, enhanced car navigation services that perform automatic pedestrian, car, traffic lights, and street signs detection.

Alternatively, the method can be used in a robotic setting where a minimal number of point and line features are used for pose estimation for gripping of industrial parts during automated manufacturing, and robot navigation in an indoor scene. For example, the environment is an indoor factory setting, and the 3D pose is used for gripping and picking small industrial parts using a robot arm.

All of the above method steps can be performed in a processor 600 connected to a memory and input/output interfaces as known in the art.

The method is now described in greater detail

Collinearity and Coplanarity

Figure 1:
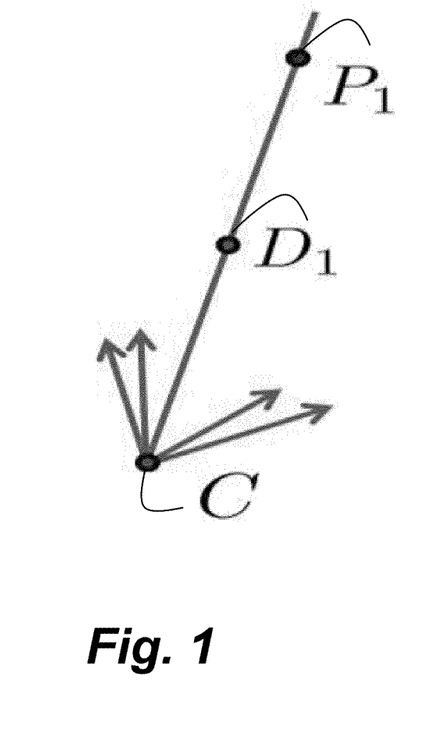
FIG. 1 is a schematic of a collinearity constraint where a point in space lies on a corresponding back-projected ray from a camera.
Figure 2:
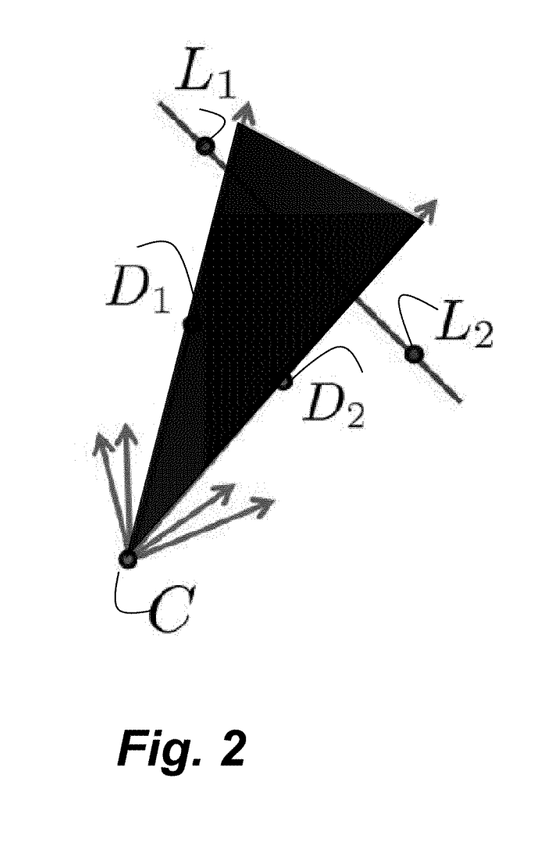
FIG. 2 is a schematic of a coplanarity constraint where a line in space lies on a corresponding interpretation plane formed by corresponding back-projected rays from a camera.

As shown in FIGS. 1-2, our method solves all four minimal configurations using only two geometric constraints: collinearity and coplanarity. The collinearity constraint comes from the 2D-3D correspondences 611. In a generic imaging setup, every pixel in an image corresponds to a 3D projection ray, and a corresponding 3D point lies on this ray, where x, y, and z are the 3D coordinates.

The minimal solutions described herein, uses a projection ray $CD_1$ linked to a 2D image feature and an associated 3D point $P_1$ in the environment are collinear when expressed in the reference frames.

In FIG. 2, two projection rays $CD_1$ and $CD_2$, linked to the end points of a 2D line, and an associated 3D line represented by two points $L_1$ and $L_2$ are all coplanar.

In FIG. 1, the projection ray $CD_1$ and the point $P_1$ lie on the ray when expressed in the same intermediate reference frame. Our goal is to find the pose, (R, T), wherein R is rotation and T is translation, under which the point $P_1$ lies on the ray $CD_1$. We stack these points in the following matrix, which we refer to as a collinearity matrix:

$$\begin{pmatrix} C_x & D_{1x} & R_{11}P_{1x} + R_{12}P_{1y} + R_{13}P_{1z} + T_1 \\ C_y & D_{1y} & R_{21}P_{1x} + R_{22}P_{1y} + R_{23}P_{1z} + T_2 \\ C_z & D_{1z} & R_{31}P_{1x} + R_{32}P_{1y} + R_{33}P_{1z} + T_3 \\ 1 & 1 & 1 \end{pmatrix} \quad (1)$$

The first collinearity constraint forces the determinant of any submatrix, with a size 3×3 of the above matrix to vanish. In other words, we obtain four constraints by removing one row at a time. Although we obtain four equations from the above matrix, only two are independent, and thus, useful.

The second coplanarity geometric constraint comes from 2D-3D line correspondences. As shown in FIG. 2, the points $C, D_1, D_2, P_1$ and $P_2$ lie on a single plane, when expressed in the same reference frame. In other words, for the correct pose [R, T], we obtain two constraints from a single 2D-3D line correspondence: the quadruplets $(C, D_1, D_2, [R, T]L_1)$, and $(C, D_1, D_2, [R, T]L_2)$ are each coplanar. The coplanarity constraint for the quadruplet $(C, D_1, D_2, [R,T]L_1)$ forces the determinant of the following matrix to vanish:

$$\begin{pmatrix} C_x & D_{1x} & D_{2x} & R_{11}L_{1x} + R_{12}L_{1y} + R_{13}L_{1z} + T_1 \\ C_y & D_{1y} & D_{2y} & R_{21}L_{1x} + R_{22}L_{1y} + R_{23}L_{1z} + T_2 \\ C_z & D_{1z} & D_{2z} & R_{31}L_{1x} + R_{32}L_{1y} + R_{33}L_{1z} + T_3 \\ 1 & 1 & 1 & 1 \end{pmatrix} \quad (2)$$

Similarly, the other quadruplet $(C, D_1, D_2, [R, T]L_2)$ also gives a coplanarity constraint. Accordingly, every 2D-3D line correspondence yields two equations from the two points on the line.

Our goal is to determine six parameters (three for R and three for T) for which the 3D features (both points and lines) satisfy the collinearity and coplanarity constraints. Thus, we have four possible minimal configurations (3 points, 2 points and 1 line, 1 point and 2 lines, and 3 lines.

Reference Frames

Figure 3:
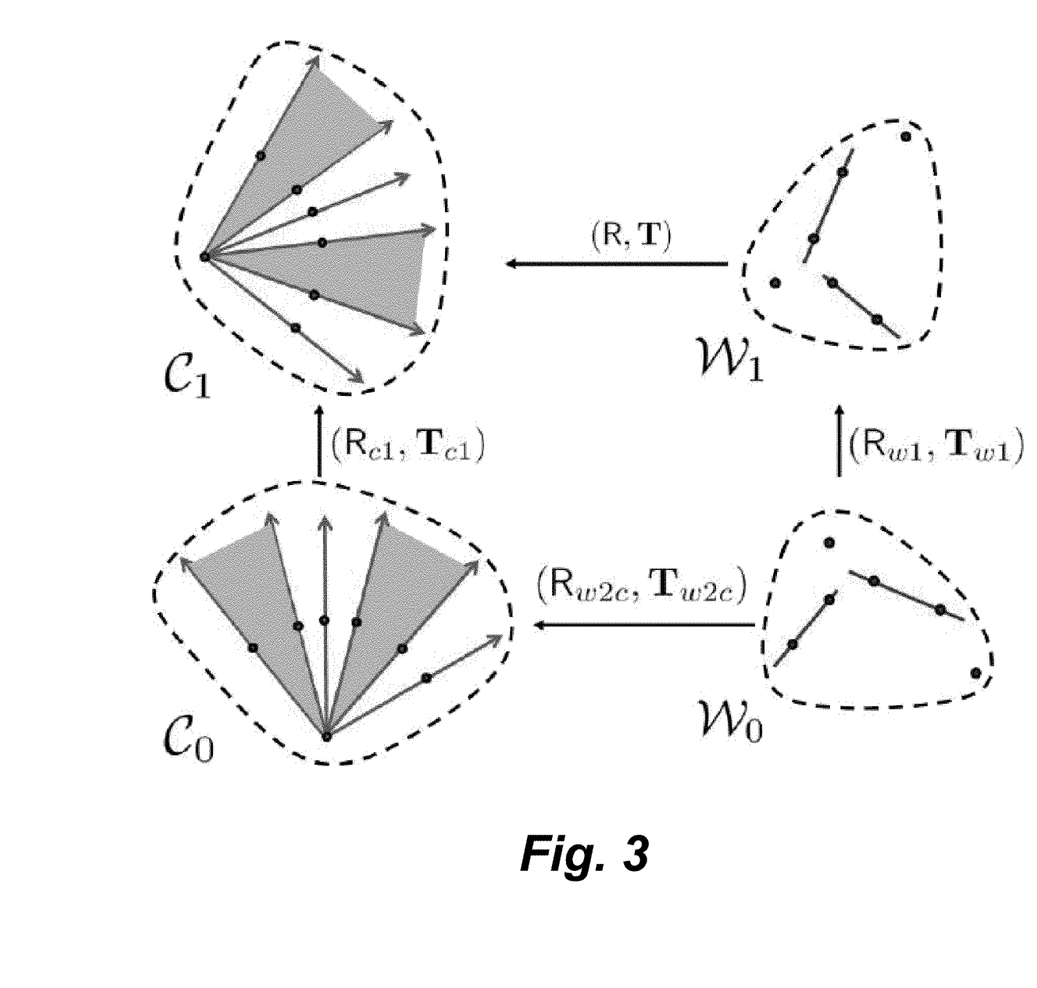
FIG. 3 is a schematic of an intermediate transformation technique where a camera and the world reference frames are transformed to corresponding intermediate camera and world reference frames: according to embodiments of the invention.

As shown in FIG. 3, the camera and world reference frames, where the points and lines reside, are denoted by $C_0$ and $W_0$, respectively.

Our goal is to determine a transform between the world and camera reference frames $W_0$ and $C_0$. We first transform $C_0$ and $W_0$ to intermediate camera and world reference frames $C_1$ and $W_1$, respectively. Next, we determine the pose between these intermediate world and camera reference frames $W_1$ and $C_1$, which can be used to determine the pose between the camera and world reference frames. The solution using these intermediate reference frames reduces the degree of the resulting polynomial significantly, i.e., from the conventional a $64^{th}$ ($2^6$) degree polynomial equation to our $4^{th}$ and $8^{th}$ degree polynomial equations.

We determine a transformation ($R_{w2c}$, $T_{w2c}$), which expresses the 3D points and lines in the world and camera reference frames. A straight-forward application of collinearity and coplanarity constraints results in six linear equations involving twelve variables (9 $R_{ij}$'s, 3 $T_i$'s). In order to solve these variables, we need additional equations. These equations can be six quadratic orthogonality constraints.

The solution of such a system eventually result in a $64^{th}$ ($2^6$) degree polynomial equation with 64 solutions. The determination of such solutions may not be feasible for several computer vision applications. Our main goal is to provide a method to overcome this difficulty. In order to do this, we first transform both the camera and world reference frames $C_0$ and $W_0$ to intermediate camera and world reference frames $C_1$ and $W_1$, respectively.

After this transformation, our goal is to find the pose (R, T) between the intermediate reference frames. We select the intermediate camera and word reference frames $C_1$ and $W_1$ such that the resulting polynomial equation is of a lowest possible degree. We describe pose estimation procedures for two minimal configurations. The other two configurations can be handled analogously.

Minimal Solutions

2 Points 1 Line

We provide a pose estimation procedure from two 2D-3D point, and one 2D-3D line correspondences. From the 2D coordinates of the points, we can determine the corresponding projection rays using calibration. In the configuration of 2D lines, we can determine the corresponding projection rays for end points of the line in the image. Below, we only consider the associated 3D projection rays for point and line features on the images.

Figure 4A:
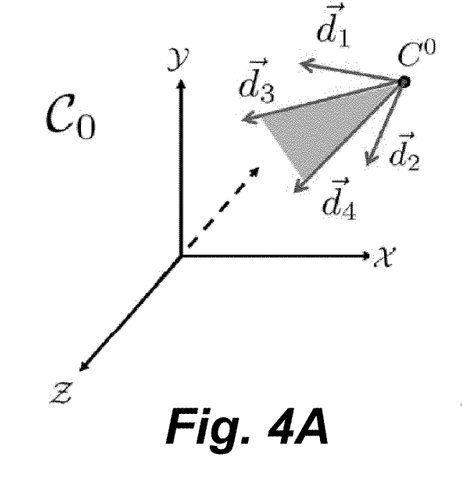
FIGS. 4A-4C are schematics of an intermediate transformation for a minimal pose estimation procedure using two points and one lines according to embodiments of the invention.
Figure 4B:
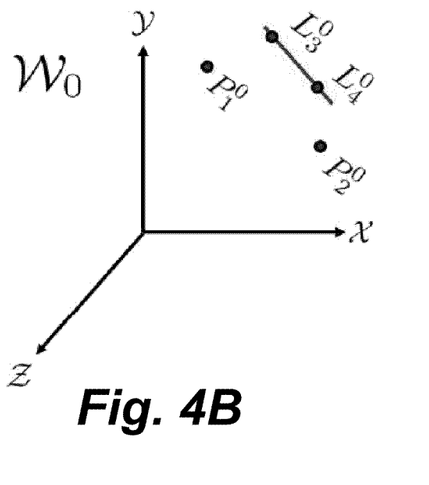
Figure 4C:
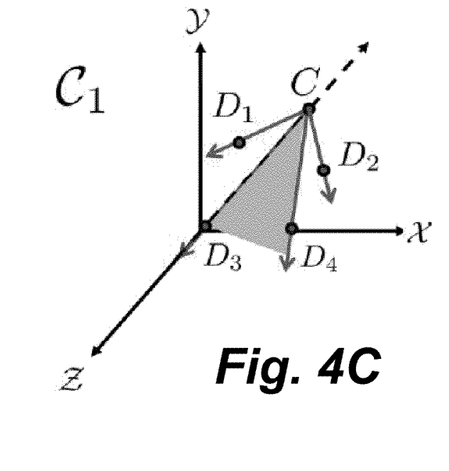
Figure 4D:
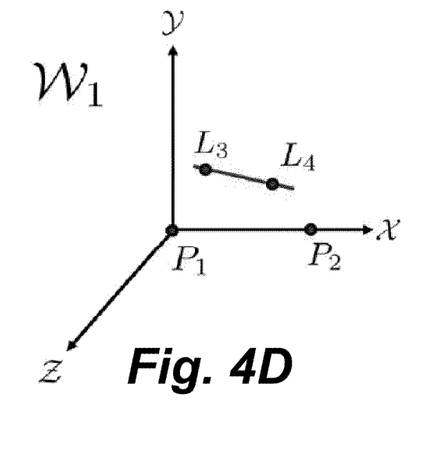

FIGS. 4A-4D show camera and world reference frames $C_0$ and $W_0$, and the intermediate camera and world reference frames $C_1$ and $W_1$ in the pose estimation from two points and one line configuration. The camera reference frames before and after the transformation are shown in FIGS. 4A and 4C, respectively. Similarly, the world reference frames before and after the transformation are shown in FIGS. 4B and 4D, respectively.

Intermediate Camera Reference Frame C1

In FIGS. 4A-4B, we show the camera projection rays (associated with 2D points and lines) and 3D features (points and lines) in camera and world reference frames $C_0$ and $W_0$, respectively. The center of the camera is $C_0$, the projection rays corresponding to the two 2D points is given by their direction vectors $\vec{d}_1$ and $\vec{d}_2$, the projection rays corresponding to the 2D line be given by direction vectors $\vec{d}_3$ and $\vec{d}_4$.

In the intermediate camera reference frame $C_1$, we always represent the projection rays of the camera using two points (center and a point on the ray). The projection rays corresponding to the two 2D points are $CD_1$ and $CD_2$, and the lines are $CD_3$ and $CD_4$. The plane formed by the triplet (C, $D_3$, $D_4$) is referred to as the interpretation plane.

We select an intermediate camera reference frame $C_1$ that satisfy the following conditions:
a. the camera center is at coordinates C(0, 0,-1);
b. one of the projection rays $CD_3$ corresponding to the line $L_3L_4$ is on the Z axis, such that $D_3$=(0, 0, 0); and
c. the other projection ray $CD_1$ corresponding to the line $L_3L_4$ lies on the XZ plane such that D4 is on the X-axis.

A transformation for any set of projection rays corresponding to two points and one line is possible using a constructive argument. Let $P_0$ and P denote the coordinates of any point in reference frames $C_0$ and C, respectively. Following this notation, the points $D_3$ and $D_4$ are expressed in $C_0$ and $C_1$ using an algebraic derivation:

$$D_3^0 = C^0 + \vec{d}_1, \, D_4^0 = C^0 + \frac{\vec{d}_2}{\vec{d}_1 \cdot \vec{d}_2}, \, D_3 = \begin{pmatrix} 0 \\ 0 \\ 0 \end{pmatrix}, \, D_4 = \begin{pmatrix} \frac{1}{\vec{d}_1 \cdot \vec{d}_2} \\ 0 \\ 0 \end{pmatrix}. \quad (3)$$

The pose ($R_{c1}$, $T_{c1}$) between $C_0$ and $C_1$ is given by the one that transforms the triplet ($C_0$, $D_3$, $D_4$) to (C, $D_3$, $D_4$).

Intermediate World Reference Frame $W_1$

The intermediate world reference frame can be described as follows. Let the Euclidean distance between any two 3D points P and Q be denoted by d(P, Q). The two 3D points and one 3D point on the 3D line in $W_1$ are $$P_1 = \begin{pmatrix} 0 \\ 0 \\ 0 \end{pmatrix}, P_2 = \begin{pmatrix} d(P_1^0, P_2^0) \\ 0 \\ 0 \end{pmatrix}, L_3 = \begin{pmatrix} X_3 \\ Y_3 \\ 0 \end{pmatrix}, \quad (4)$$

where $X_3$ and $Y_3$ can be determined using trigonometry $$X_3 = (L_3 - P_1) \cdot \left(\frac{P_2 - P_1}{d(P_1, P_2)}\right), \quad (5)$$

$$Y_3 = \left| L_3 - P_1 + X_3 \cdot \frac{(P_2 - P_1)}{d(P_1, P_2)} \right|.$$

The pose ($R_{w1}$, $T_{w1}$) between the world reference frame $W_0$ and the intermediate world reference frame $W_1$ is given by the one that transforms the triplet ($P_1^0$, $P_2^0$, $L_3^0$) to ($P_1$, $P_2$, $L_3$). For brevity, we use the following notation in the pose estimation procedure $$D_{i=\{1,2\}} = \begin{pmatrix} a_i \\ b_i \\ 0 \end{pmatrix}, D_3 = \begin{pmatrix} 0 \\ 0 \\ 0 \end{pmatrix}, D_4 = \begin{pmatrix} a_4 \\ 0 \\ 0 \end{pmatrix}$$

$$P_1 = \begin{pmatrix} 0 \\ 0 \\ 0 \end{pmatrix} P_2 = \begin{pmatrix} X_2 \\ 0 \\ 0 \end{pmatrix}, L_3 = \begin{pmatrix} X_3 \\ Y_3 \\ 0 \end{pmatrix}, L_4 = \begin{pmatrix} X_4 \\ Y_4 \\ Z_4 \end{pmatrix}.$$

Pose Estimation Between Intermediate Camera and World Reference Frames $C_1$ and $W_1$ The first step is stacking all the available collinearity and coplanarity constraints in matrices. In this case, we have two collinearity matrices for the triplets (C, $D_1$, $P_1$) and (C, $D_2$, $P_2$) corresponding to the 3D points $P_1$ and $P_2$, respectively. As indicated in Equation 1, these two collinearity matrices give four equations.

In addition, we have two coplanarity equations from the quadruplets (C, $D_3$, $D_4$, $L_3$) and (C, $D_3$, $D_4$, $L_4$) corresponding to the 3D line $L_3L_4$. After stacking the constraints from the determinants of (sub)-matrices, we obtain a linear system AX=B where A, X and B are $$A = \begin{pmatrix} 0 & 0 & 0 & 0 & 0 & -b_1 & a_1 & 0 \\ 0 & 0 & 0 & 0 & 0 & 0 & -1 & b_1 \\ -b_2X_2 & a_2X_2 & 0 & 0 & 0 & -b_2 & a_2 & 0 \\ 0 & -X_2 & b_2X_2 & 0 & 0 & 0 & -1 & b_2 \\ 0 & X_3 & 0 & Y_3 & Z_3 & 0 & 1 & 0 \\ 0 & X_4 & 0 & Y_4 & Z_4 & 0 & 1 & 0 \end{pmatrix}, \quad (6)$$

$$X = (R_{11}\ R_{21}\ R_{31}\ R_{22}\ R_{23}\ T_1\ T_2\ T_3)^T, \text{ and} \quad (7)$$

$$B = (0\ -b_1\ 0\ b_2\ 0\ 0)^T. \quad (8)$$

The matrix A has known variables, and is of rank 6. As there are 8 variables in the linear system, we can obtain a solution in a subspace spanned by two vectors a. $X = u + l_1 v + l_2 w$, where u, v and w are known vectors of size 8×1.

Next, we use orthogonality constraints from the rotation matrix to estimate the unknown variables $l_1$ and $l_2$. We can write two orthogonality constraints involving the rotation variables $$R_{11}^2 + R_{21}^2 + R_{31}^2 = 1$$

$$R_{21}^2 + R_{22}^2 + R_{23}^2 = 1$$

After substituting these rotation variables as functions of $l_1$ and $l_2$ and solving the above quadratic system of equations, we obtain four solutions for $(l_1, l_2)$, and thus, four solutions for $(R_{11}, R_{21}, R_{31}, R_{22}, R_{23})$.

Using the orthogonality constraints, the five elements in the rotational matrix uniquely determine the other elements. Thus the 2 point and 1 line configuration yields a total of four solutions for the pose (R, T).

1 Point 2 Lines

In this section, we describe a pose estimation procedure from one 2D-3D point, and two 2D-3D line correspondences.

Intermediate Camera Reference Frame $W_1$

Figure 5A:
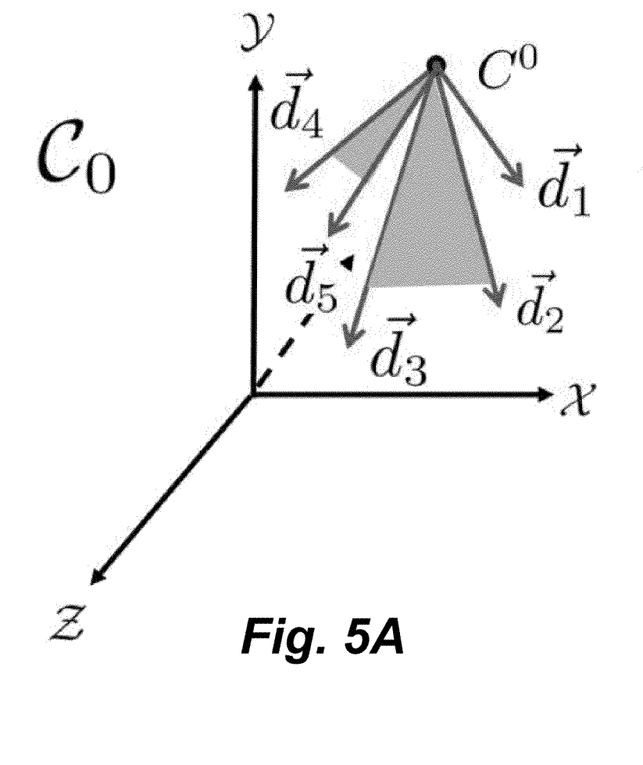
FIGS. 5A-5D are schematics of an intermediate transformation for a minimal pose estimation procedure using one points and two lines according to embodiments of the invention.
Figure 5B:
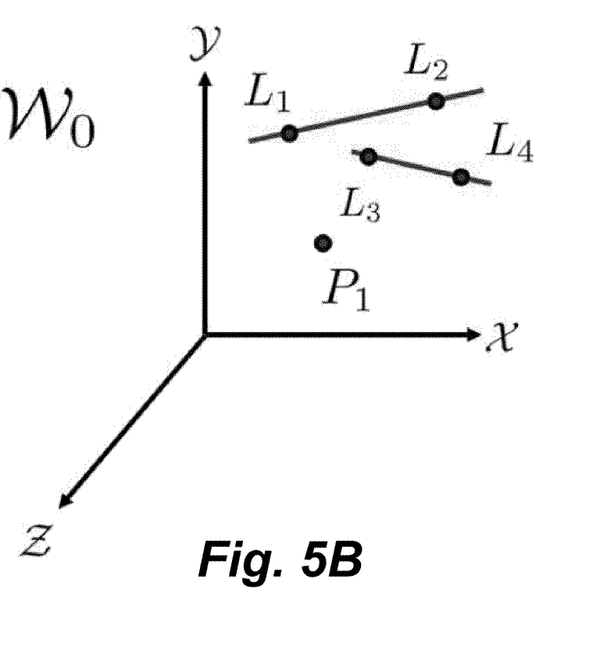

FIGS. 5A-5B show the camera projection rays (associated with 2D points and lines) and 3D features (points and lines) in camera and world reference frames $C_0$ and $W_0$, respectively. In the camera reference frame $C_0$, the center of the camera is at $C^0$, the projection rays corresponding to the 2D point is given by direction vector $\vec{d}_1$, the projection rays corresponding to the two 2D lines be given by the pairs of direction vectors $(\vec{d}_2, \vec{d}_3)$ and $(\vec{d}_4, \vec{d}_5)$. In the intermediate camera reference frame $C_1$, the rays corresponding to the 2D point are $CD_1$, the rays linked with the two lines are pairs $(CD_2, CD_3)$ and $(CD_3, CD_4)$, respectively.

Figure 5C:
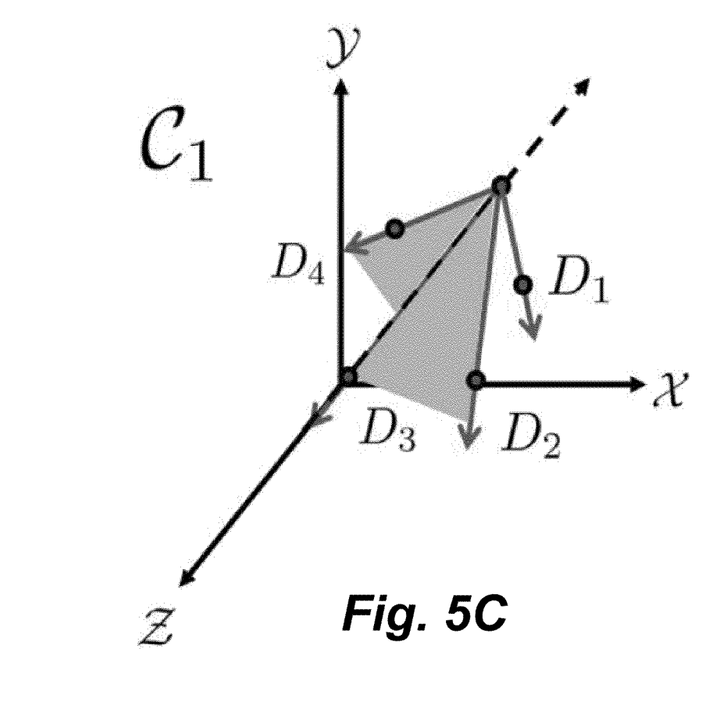

We select $C_1$ by satisfying the following conditions:

a. the center of the camera is at (0, 0, -1);
b. the projection ray $CD_3$ from the line of intersection of the two interpretation planes lie on Z axis such that $D_3 = (0, 0, 0)$, and
c. the ray $CD_2$ lies on the XZ plane where $D_2$ is on X axis.

Similar to the configuration above, we prove that such a transformation is possible by construction. The unit normal vector for the interpretation plane $(C_0, \vec{d}_2, \vec{d}_3)$ is given by $\vec{n}_1 = \vec{d}_2 \times \vec{d}$ and $\vec{d}_2 = \vec{d}_4 \times \vec{d}$. The direction vector of the line of intersection of the two planes can be determined as $\vec{d}_{12} = \vec{d}_1 \times \vec{d}_2$. The direction vectors $\vec{d}_2, \vec{d}_{12}$ and $\vec{d}_4$ in $C_0$ correspond to the projection rays $CD_2, CD_3$ and $CD_4$, respectively.

Using algebraic transformations, the points $D_2$ and $D_3$ before and after the transformation to the intermediate reference frames:

$$D_2^0 = C^0 + \frac{\vec{d}_2}{\vec{d}_2 \cdot \vec{d}_{12}}, D_3^0 = C^0 + \vec{d}_{12}, \quad (9)$$

$$D_2 = \begin{pmatrix} 1 \\ \frac{1}{\vec{d}_2 \cdot \vec{d}_{12}} \\ 0 \\ 0 \end{pmatrix}, D_3 = 0_{3 \times 1}.$$

The transformation between the camera reference frame $C_0$ and the intermediate camera reference frame $C_1$ is given by the one that project the triplet $(C^0, D^0_2, D^0_3)$ to $(C, D_2, D_3)$.

Intermediate World Reference Frame $W_1$

Figure 5D:
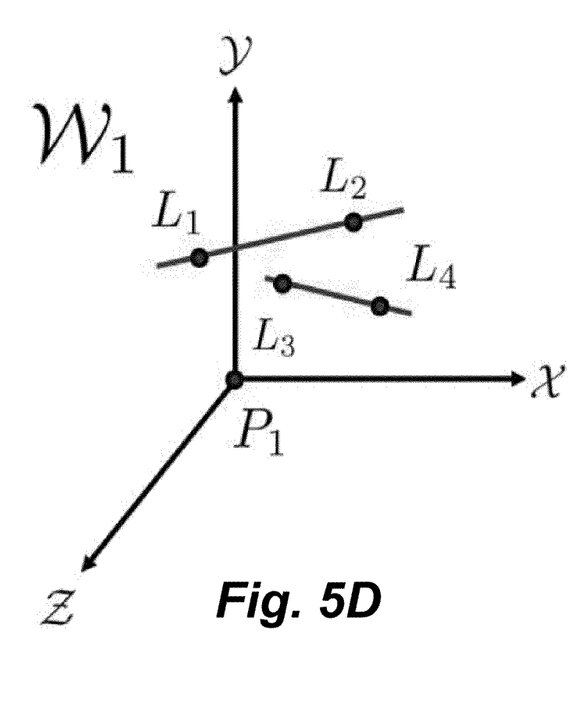

The intermediate world reference frame $W_1$ is selected such the single 3D point $P_1$ lie at the origin (0, 0, 0). The transformation between the world reference frame $W_0$ and the intermediate world reference frame $W_1$ translates $P^0_1$ to $P_1$. For brevity, we use the following notation for the several points in $C_0$ and $W_0$:

$$D_{i=\{1,2,4\}} = \begin{pmatrix} a_i \\ b_i \\ 0 \end{pmatrix}, D3 = 0_{3 \times 1}, L_{i=\{2,3,4,5\}} = \begin{pmatrix} X_i \\ Y_i \\ Z_i \end{pmatrix} \quad (10)$$

Pose Estimation Between Intermediate Camera and World Reference Frames $C_1$ and $W_1$ We described the pose estimation using one point and two line correspondences. We stack the two collinearity equations from the triplet $(C, D_1, P_1)$ and four coplanarity equations from the quadruplets $(C, D_2, D_3, L_2)$, and $(C, D_2, D_3, L_3)$. We construct the following linear system: $AX = B$, where A, X and B are $$A^T = \begin{pmatrix} 0 & 0 & 0 & 0 & -b_4X_4 & -b_4X_5 \\ 0 & 0 & 0 & 0 & -b_4Y_4 & -b_4Y_5 \\ 0 & 0 & 0 & 0 & -b_4Z_4 & -b_4Y_5 \\ 0 & 0 & X_2 & X_3 & a_4X_4 & a_4X_5 \\ 0 & 0 & Y_2 & Y_3 & a_4Y_4 & a_4Y_5 \\ 0 & 0 & Z_2 & Z_3 & a_4Z_4 & a_4Z_5 \\ -b_1 & 0 & 0 & 0 & -b_4 & -b_4 \\ -a_1 & 0 & 0 & 0 & -a_4 & -a_4 \\ 0 & -b_1 & 0 & 0 & 0 & 0 \end{pmatrix} \quad (11)$$

$$X = (R_{11}\ R_{12}\ R_{13}\ R_{21}\ R_{22}\ R_{23}\ T_1\ T_2\ T_3)^T \quad (12)$$

$$B = (0\ -b_1\ 0\ 0\ 0\ 0)^T \quad (13)$$

In the linear system $AX = B$, the first and second rows are obtained using the collinearity constraint of Equation 1 for the triplet $(C, D_1, P_1)$. The third, fourth, fifth and sixth rows are obtained using the coplanarity constraint of Equation 2 for the quadruplets $(C, D_2, D_3, L_2)$, $(C, D_2, D_3, L_3)$, $(C, D_3, D_4, L_4)$ and $(C, D_3, D_4, L_5)$, respectively.

The matrix M has known variables and is of rank 6. As there are 9 variables in the linear system, we can obtain a solution in a subspace spanned by two vectors as shown below: $X = u + l_1v + l_2w + l_3y$, where u, v, w and y are known vectors of size 9×1, and $l_1, l_2$ and $l_3$ are unknown variables. The three orthogonality constraints involving the rotation variables $R_{11}$, $R_{12}$, $R_{13}$, $R_{21}$, $R_{22}$ and $R_{23}$ (individual elements in X expressed as functions of ($l_1$, $l_2$ and $l_3$):

$$R_{11}^2 + R_{12}^2 + R_{13}^2 = 1$$

$$R_{21}^2 + R_{22}^2 + R_{23}^2 = 1$$

$$R_{11}R_{21} + R_{12}R_{22} + R_{13}R_{23} = 0.$$

To obtain efficient and stable solution for the above Equations, we use an automatic solvers, constructed using Gröbner basis methods, to obtain the eight different solutions for ($l_1$, $l_2$, $l_3$). Consequently, this produced eight solutions for the pose (R, T).

Degenerate Configurations and Other Scenarios

Among the 3D features, if a 3D point lies on a 3D line, then the configuration is degenerate. It is possible to solve the three points and three lines using the same idea of coordinate transformation and the use of collinearity and coplanarity constraints.

EFFECT OF THE INVENTION

In many real world applications, finding three point or three line correspondences is not always possible. The invention improves this situation by giving a choice of mixing these features and thereby enable solution in cases, which were not possible before.

Our formulation of the problem using collinearity and coplanarity constraints and the techniques to select intermediate reference frames is very useful in many applications such as geo-location and object detection in urban environments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for determining a three-dimensional (3D) pose of a 3D object in an environment, comprising:
extracting features from an image acquired of the environment by a camera; matching the features to a 3D model of the environment to determine correspondences; transforming a camera reference frame of the image and a world reference frame of the environment to a corresponding intermediate camera reference frame and a corresponding world reference frame using the correspondences; applying geometrical constraints to the intermediate camera reference frame and the intermediate world reference frame to obtain a constrained intermediate world reference frame and a constrained world reference frame; and determining the 3D pose from parameters of the constrained intermediate world reference frame and the constrained world reference frame, wherein the steps are performed in a processor.

2. The method of claim 1, wherein the environment is an outdoor urban scene, and the 3D pose is used for geo-location.

3. The method of claim 1, wherein the pose is used for automated navigation.

4. The method of claim 1, wherein the environment is an indoor factory setting, and the 3D pose is used for gripping and picking small industrial parts using a robot arm.

5. The method of claim 1, wherein the geometrical constraints are collinearity and coplanarity constraints.

6. The method of claim 1, wherein the features include two points and a line.

7. The method of claim 1, wherein the features include one point and two lines.

8. The method of claim 1, wherein the parameters include three rotation and three translation parameters of the pose.

9. The method of claim 1, wherein the pose is determined using $4^{th}$ degree polynomial equations.

10. The method of claim 1, wherein the pose is determined using $8^{th}$ degree polynomial equations.

11. The method of claim 1, wherein the intermediate camera reference frame, a center of the camera center is at coordinates ('(0,0,−1), a projection ray of a first line corresponds to a line on a Z axis, and a projection ray of a second line corresponding to a line on the XZ plane.

12. The method of claim 1, wherein the pose is estimated using a random sample consensus framework.

* * * * *